(12) United States Patent
Spence

(10) Patent No.: US 8,115,592 B2
(45) Date of Patent: Feb. 14, 2012

(54) SYSTEM FOR SUBMITTING ALERT NOTICES TO MOBILE COMMUNICATION DEVICES

(75) Inventor: Perry S. Spence, Saint Peters, MO (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 907 days.

(21) Appl. No.: 11/622,539

(22) Filed: Jan. 12, 2007

(65) Prior Publication Data

US 2008/0169920 A1    Jul. 17, 2008

(51) Int. Cl.
*G08B 5/22* (2006.01)
(52) U.S. Cl. ... 340/6.1; 340/1.1; 340/539.1; 340/539.11; 340/902; 455/404.1; 455/404.2; 455/414.1; 455/466
(58) Field of Classification Search ............ 340/539.11, 340/539.1, 825.36, 902, 1.1, 6.1; 455/456.1, 455/404.2, 414.1, 435.2, 404.1, 466
See application file for complete search history.

(56) References Cited

U.S. PATENT DOCUMENTS

| 6,603,405 | B2* | 8/2003 | Smith | 340/905 |
|---|---|---|---|---|
| 7,089,116 | B2* | 8/2006 | Smith | 702/3 |
| 2003/0063004 | A1* | 4/2003 | Anthony et al. | 340/574 |
| 2003/0169181 | A1* | 9/2003 | Taylor | 340/902 |
| 2005/0046594 | A1* | 3/2005 | Taylor | 340/905 |
| 2005/0239436 | A1* | 10/2005 | Bell et al. | 455/404.2 |
| 2005/0288035 | A1* | 12/2005 | Wang | 455/456.1 |
| 2006/0218029 | A1* | 9/2006 | Chin | 705/8 |

FOREIGN PATENT DOCUMENTS

WO    0152512 A3    7/2001

\* cited by examiner

*Primary Examiner* — George Bugg
*Assistant Examiner* — Sisay Yacob
(74) *Attorney, Agent, or Firm* — Guntin Meles & Gust, PLC; Ed Guntin

(57) ABSTRACT

A system for submitting alert notices to mobile communication devices is disclosed. An apparatus that incorporates teachings of the present disclosure may include, for example, a mobile communication device (MCD) having a controller element that transmits to an alert generation system (AGS) a location coordinate in order for the AGS to submit an alert notice to the MCD when the MCD is in proximity to an alert condition. Additional embodiments are disclosed.

17 Claims, 3 Drawing Sheets

300

SYSTEM FOR SUBMITTING ALERT NOTICES TO MOBILE COMMUNICATION DEVICES

FIELD OF THE DISCLOSURE

The present disclosure relates generally to alert systems, and more specifically to a system for submitting alert notices to mobile communication devices.

BACKGROUND

Most public alert systems operate according to broadcast principles. For example, a weather warning or other form of alert is generally broadcast by a webpage, email, pages, news networks and the like. Often the recipients of such broadcasts may not be affected or have an interest in such alerts, and may find them in some situations to be a nuisance.

A need therefore arises for a system for submitting alert notices to mobile communication devices.

DETAILED DESCRIPTION

Embodiments in accordance with the present disclosure provide a system for submitting alert notices to mobile communication devices.

In a first embodiment of the present disclosure, a computer-readable storage medium in an alert generation system (AGS) can have computer instructions for monitoring a location of each of a plurality of mobile communication devices (MCDs), monitoring locations of alert conditions, and notifying a select one or more of the plurality of MCDs of one or more alert conditions detected when the select one or more of the plurality of MCDs are in a proximity to the detected one or more alert conditions.

In a second embodiment of the present disclosure, an MCD can have a controller element that transmits to an AGS a location coordinate in order for the AGS to submit an alert notice to the MCD when the MCD is in proximity to an alert condition.

In a third embodiment of the present disclosure, an alert response center (ARC) can have a controller element for transmitting to an AGS a location coordinate of an alert condition detected by the ARC in order for the AGS to submit an alert notice to an MCD when the MCD is in proximity to the location of the detected alert condition.

Figure 1:
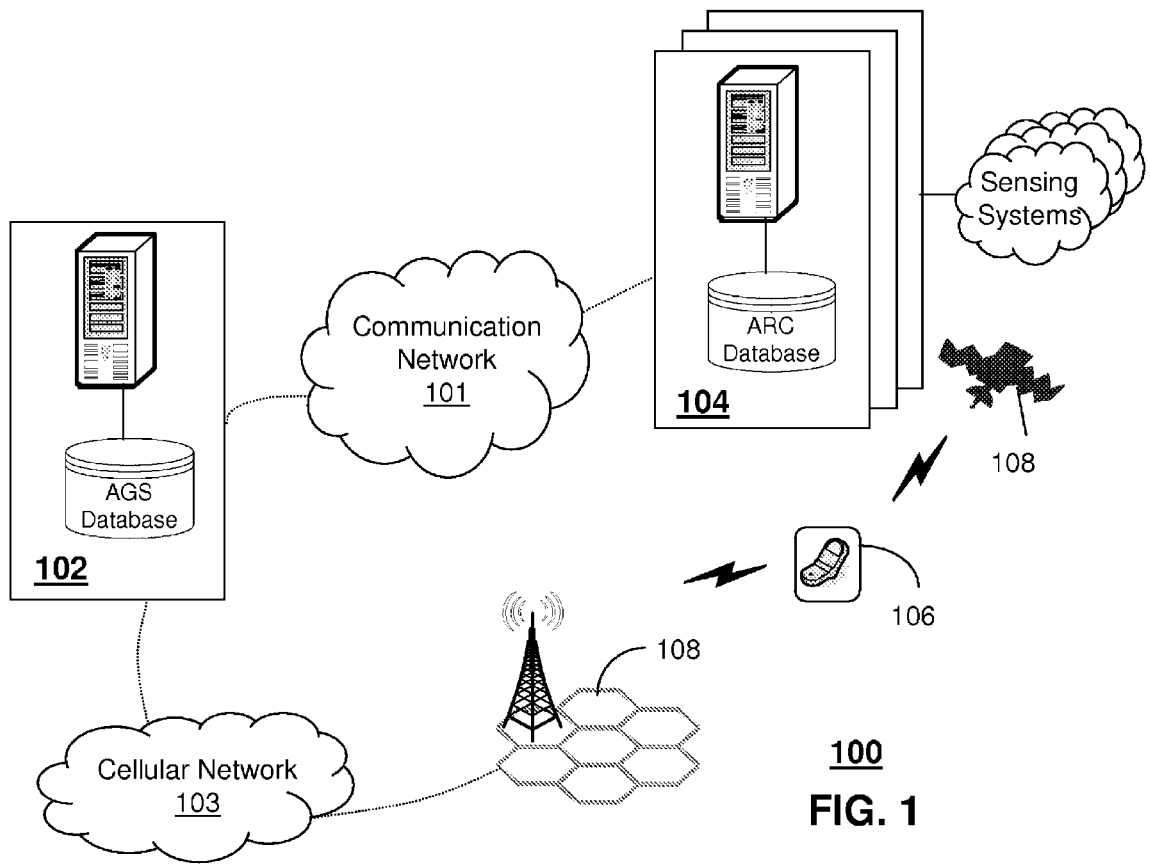
FIG. 1 depicts an exemplary embodiment of a communication system.

FIG. 1 depicts an exemplary embodiment of a communication system 100. The communication system 100 can comprise an Alert Generation System (AGS) 102 coupled to one or more Alert Response Centers (ARCs) 104 by way of a communication network 101. The communication network 101 can comprise common wireless or wireline circuit-switched or packet switched network elements that facilitate interconnecting the AGS 102 with the ARCs 104. Each ARC 104 can comprise common computing technologies (e.g., server), mass storage technologies, and communication technologies which can be combined with sensing system technologies (e.g., weather monitoring satellites, surveillance systems, etc.) for monitoring and detecting alerts which may be of interest to third parties. The AGS 102 comprises computing, mass storage and communication technologies which can be utilized for monitoring locations of mobile communication devices (MCDs) 106 roaming in the communication system 100 and alerting them to the alerts generated by the ARCs 104 as needed.

The MCD 106 can be represented by a common computing device (e.g., laptop), a cellular phone, a satellite phone, telemetry system (such may be integrated in an automobile) or other suitable mobile communication device, each capable of communicating wirelessly with one or more Wireless Access Points (WAPs) 108 of the communication system 100. The WAPs 108 of FIG. 1 depict a number of possible embodiments including without limitation a plurality of terrestrial cellular base stations supporting wireless voice and/or data communications in a cellular network 103, and/or a satellite communication system. The cellular network 103 can utilize circuit-switched and/or packet-switched technology for transporting voice and data signals utilizing common technologies such as GSM-GPRS, EDGE, CDMA-1X, EV/DO, UMTS, WiMAX, Software Defined Radio (SDR) and other known or next generation cellular communications technologies. For communications beyond the reach of terrestrial systems such as in the case of air and water navigation, the WAP 108 can represent two-way satellite communication systems which in some instances can operate in combination with terrestrial communication systems.

Figure 2:
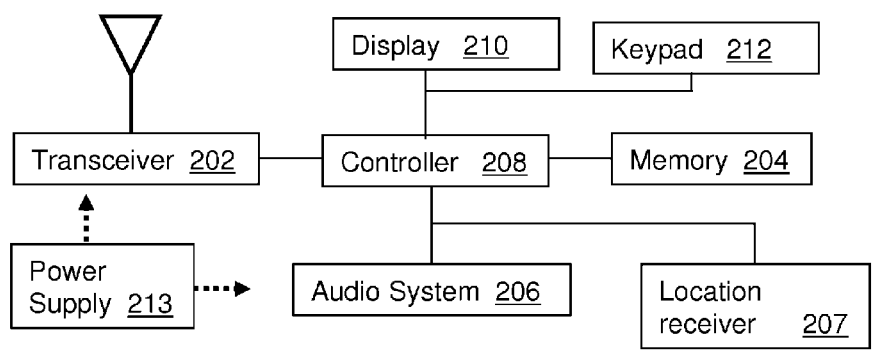
FIG. 2 depicts an exemplary embodiment of a mobile communication device (MCD) operating in the communication system.

FIG. 2 is an exemplary block diagram of the MCD 106. The MCD 106 can comprise short range communications technology in a wireless transceiver 202 such as used by cordless phones, or by way of Bluetooth or WiFi to support mobility within a small area such as the end user's residence or enterprise. The wireless transceiver 202 can further support mid to long-range wireless communications with the WAPs 108 by way of cellular, or satellite communication technologies. The MCDs 106 can further include a location receiver 207 such as a common Global Positioning System (GPS) receiver for determining a location fix of the MCD by way of a constellation of GPS satellite signals.

The MCDs 106 can also comprise a memory 204, an audio system 206, and a controller 208 among other possible functional components. The memory 204 can comprise storage devices such as RAM, SRAM, DRAM, and/or Flash memories. The memory 204 can be external or an integral component of the controller 208. The audio system 206 can be utilized for exchanging audible signals with an end user. The MCD 106 can further include a display 210 (e.g., color or monochrome LCD) for conveying images to the end user, a keypad 212 for manipulating operations of the MCD 106, and a portable power supply 213. The audio system 206, the display 210, and the keypad 212 can singly or in combination represent, a user interface (UI) for controlling operations of the MCD 106 as directed by the end user. The controller 208 can manage the foregoing components with computing technology such as a microprocessor and/or digital signal processor.

Figure 3:
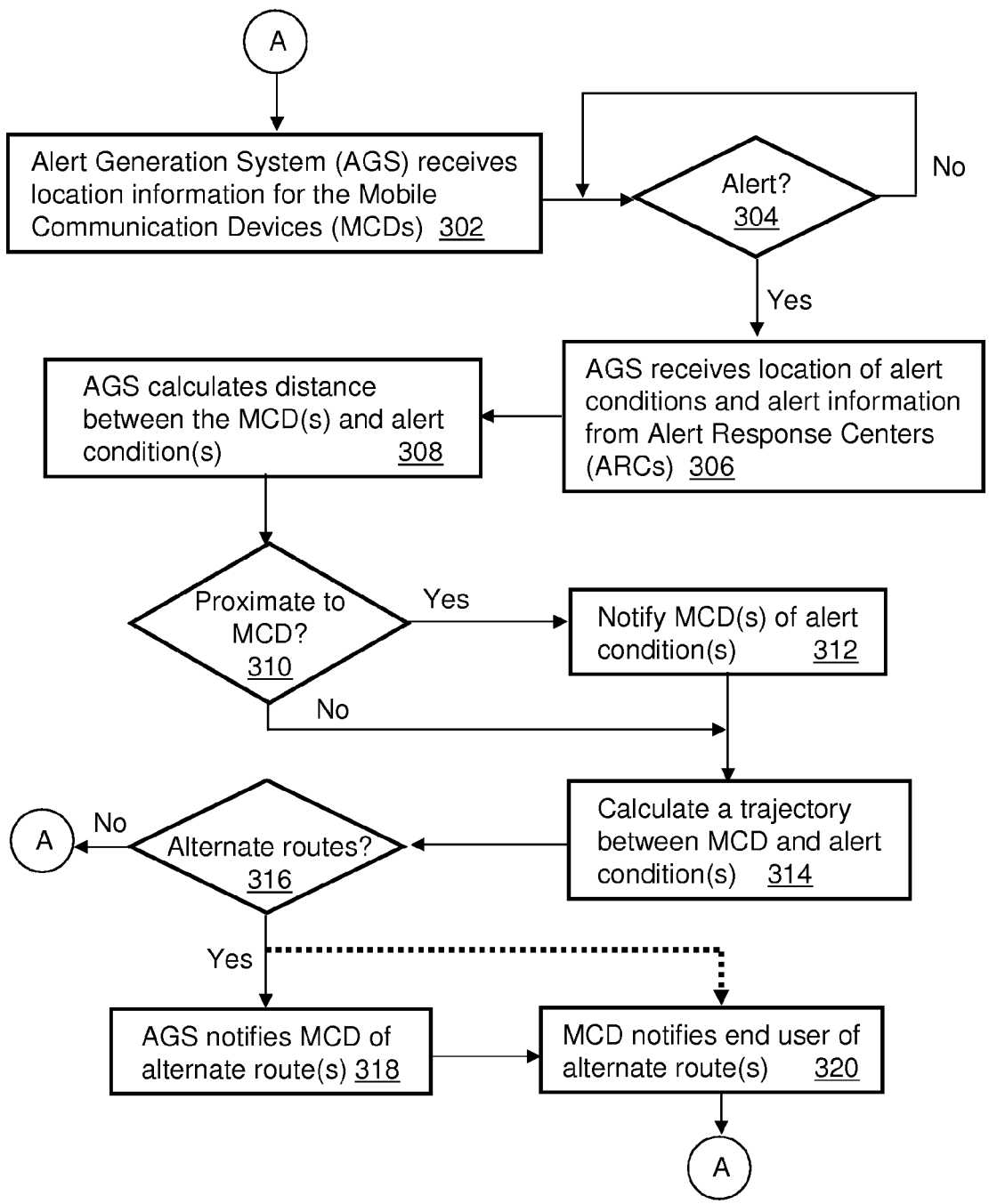
FIG. 3 depicts an exemplary method operating in portions of the communication system.

FIG. 3 depicts an exemplary method 300 operating in portions of the communication system 100. Method 300 begins with step 302 in which the AGS receives location information such as longitudinal and latitudinal coordinates of the MCDs 106. This step can represent either a polling or proactive step by the MCDs 106. That is, the AGS 102 can periodically request location information from the MCDs 106 (polling method), or the MCDs 106 can provide such information proactively. Alternatively, the AGS 102 can retrieve location information from a service provider managing the WAPs 108 having access to location information associated with MCDs 106 operating in its network.

In step 304, the AGS 102 can be programmed to monitor alerts generated by one or more ARCs 104. The ARCs 104 can, for example, supply alert conditions associated with predicted, pending or actual events. Predicted events can be derived from common prediction models applied by the ARC (e.g., Tornado or hurricane modeling, automobile congestion modeling, etc.). Pending events can represent actual conditions which have yet to cause an actual effect (e.g., a hurricane expected to hit the cost of a US city at a given time). Actual events represent events taking place at the time of detection.

Alert conditions can represent without limitation hazardous weather, ground travel, air travel, hostility, or amber alert events. An ARC 104 can be represented by any number of monitoring centers such as for instance a local weather station, local police station, the national weather center, homeland security, a public service access point (PSAP) providing 911 services, and so forth. It would be apparent to an artisan of ordinary skill in the art that the possible types of ARCs 104 and possible conditions which can trigger an alert suitable for use by the AGS 102 cannot all be enumerated in the present disclosure for practical reasons. Nonetheless, it would be apparent to said artisan that the examples given in the present disclosure are not limiting to the scope of application presented herein.

When the AGS 102 detects an alert condition from one or of the ARCs 104 in step 304, the AGS 102 proceeds to step 306 where it receives location information associated with the alert condition(s) detected. Like in step 302, the location information can be polled by the AGS 102 or proactively supplied by the ARCs 104 with the inclusion of information describing the alert condition. With the location coordinate of the MCDs 106 and the alert condition, the AGS 102 calculates in step 308 a distance between the MCD(s) and the alert condition(s). If the AGS 102 detects in step 310 that the distance calculated is in the proximate vicinity of one or more of the MCDs 106 monitored, the AGS 102 proceeds to step 312 where it notifies the MCD(s) 106 that can be affected by the alert condition by transmitting a wireless message by way of the WAPs 108.

Proximity can be determined by a proximity threshold (e.g., MCDs 106 two miles or less from the alert condition are notified). Since alert conditions can vary in their geographic scope of how they may have an effect on the population of MCD 106 end users, a proximity threshold can be established for each possible alert condition generated by an ARC 104. The proximity threshold associated with each alert condition type can be generated by the service provider managing the AGS 102, the ARCs 104, and/or end users of the MCDs 106. By utilizing proximity thresholds, notices generated in step 312 can be more readily managed, thereby causing less network congestion and annoyance to end users of MCDs 106 who are far enough from the alert condition to be concerned or interested in being notified.

The wireless message can be of any suitable format such as, for example, a Short Message System (SMS) message, an email, an instant message, or other common formats that can be intercepted by the affected MCDs 106. The message can be presented by the MCDs 106 in text form through its display 210, and/or audibly by way of the audio system 206 using text to voice synthesis or playback of a voice recording included in the wireless message. The wireless message can include information about the alert condition type, as well as details associated with the alert condition detected. For example, in the case of a Tornado warning, a prediction can be made by an ARC 104 that a Tornado may arise in a particular location between a range of times with a predicted trajectory and severity. Such a message can be presented by the MCD 106 visually and/or audibly.

If in step 310 no MCDs 106 are detected in the proximity of the alert condition(s), then the AGS 102 can proceed to step 314 to calculate a trajectory between the MCDs 106 and the alert condition(s) to provide potential MCD end users a forewarning. The AGS 102 or the MCD 106 can also be programmed to proceed from step 312 to step 314 also. In this latter case the AGS 102 performs the trajectory calculations, it determines in step 316 if alternate routes are available to avoid the alert condition(s) detected. If not, the AGS 102 returns to step 302 and repeats the aforementioned steps. If one or more alternative routes are found, the AGS 102 notifies the MCD 106 of said routes in step 318 by transmitting similar wireless messages, which the MCD conveys to the end user in step 320 with audible and/or visual techniques said alternative routes. If the MCD 106, on the other hand, is performing step 314 independently utilizing, for example, the facilities of its GPS system with mapping capabilities, then step 318 can be skipped. In either case, the MCD 106 can be programmed to further utilize the alternate route(s) and provide navigation instructions to the end user utilizing common GPS navigation techniques. From step 320 method 300 recycles to step 302. Method 300 can be applied to terrestrial, celestial and naval applications.

Upon reviewing the aforementioned embodiments, it would be evident to an artisan with ordinary skill in the art that said embodiments can be modified, reduced, or enhanced without departing from the scope and spirit of the claims described below. For example, the trajectory steps of method 300 can be eliminated, or the trajectory calculations can always be performed by the AGS 102. These are but a few examples of modifications that can be applied to the present disclosure without departing from the scope of the claims stated below. Accordingly, the reader is directed to the claims section for a fuller understanding of the breadth and scope of the present disclosure.

Figure 4:
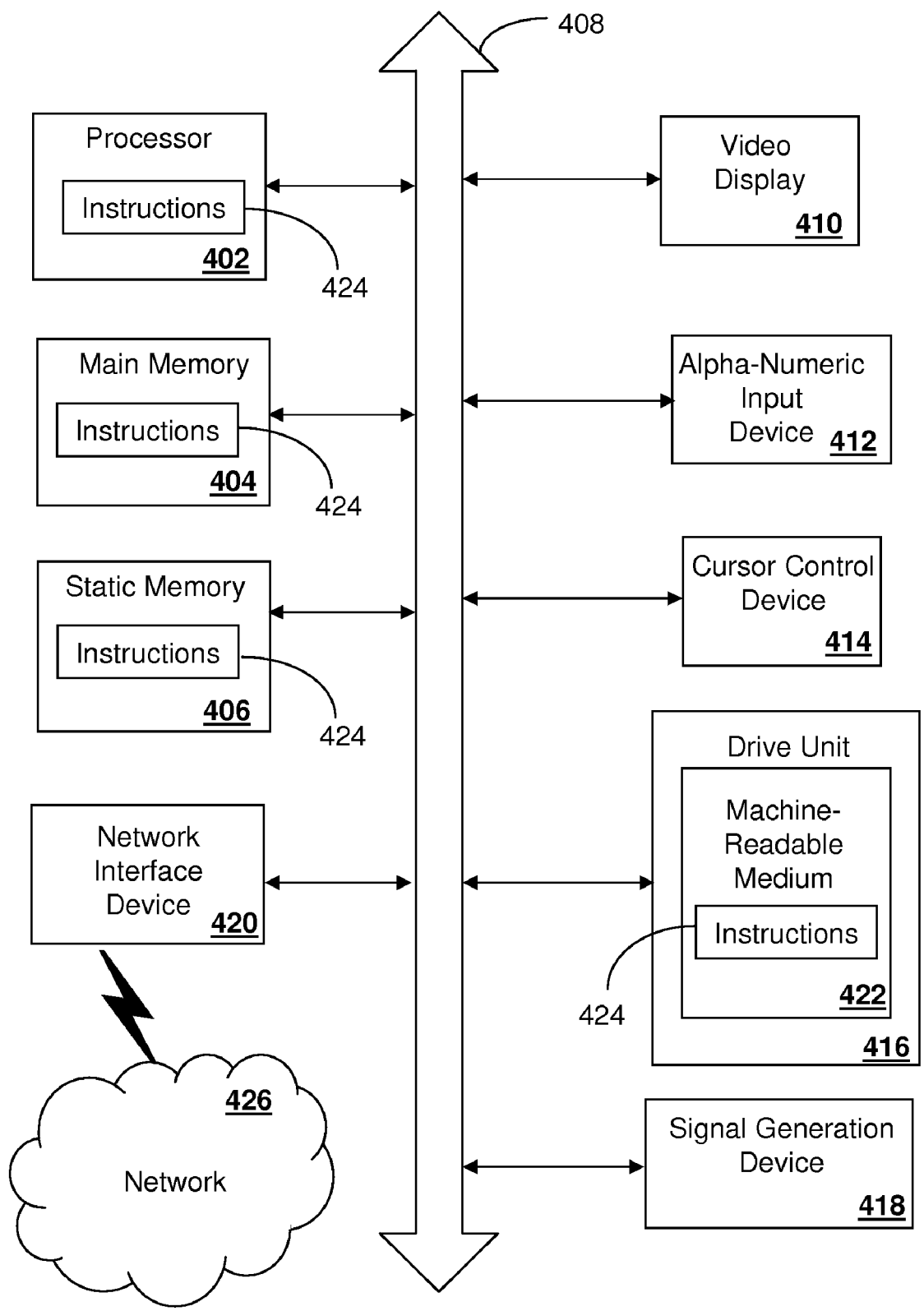
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium in an alert generation system (AGS), comprising computer instructions for:
 establishing at least one different proximity threshold for each of a plurality of alert conditions, wherein each proximity threshold comprises a distance away from an affected area where an alert condition is identified;
 monitoring a location of each of a plurality of mobile communication devices (MCDs);
 monitoring locations of an occurrence of the plurality of alert conditions;
 detecting the occurrence of one or more alert conditions from the plurality of alert conditions;
 comparing the location of each of the plurality of MCDs with the locations of the detected one or more alert conditions;
 identifying from the comparison a select one or more of the plurality of MCDs that satisfy the proximity threshold of the detected one or more alert conditions;
 notifying the select one or more MCDs of the detected one or more alert conditions;
 calculating a trajectory between each of the select one or more MCDs and the one or more alert conditions detected, wherein the trajectory is calculated based on location information generated by Wireless Access Points (WAPs) utilized by the MCDs;
 determining one or more alternate routes to avoid the one or more alert conditions detected, the alternate routes being determined based on the calculated trajectory and the detected locations of the one or more alert conditions; and
 notifying the select one or more MCDs of the one or more alternate routes to enable the select one or more MCDs to present navigation instructions directed to one of the one or more alternate routes utilizing a Global Positioning System (GPS) receiver of the select one or more MCDs.

2. The non-transitory storage medium of claim 1, wherein the alert conditions monitored comprise at least one among a predicted event, a pending event, and actual event.

3. The non-transitory storage medium of claim 1, wherein the alert conditions monitored comprise at least one among a hazardous weather event, a hazardous ground travel event, a hazardous air travel event, a hostility event, and an amber alert event.

4. The non-transitory storage medium of claim 1, comprising computer instructions for calculating a distance between each of the plurality of MCDs and the one or more alert conditions detected.

5. The non-transitory storage medium of claim 4, comprising computer instructions for performing the notification step for the select one or more of the plurality of MCDs when the calculated distance falls below one or more proximity thresholds associated with each of the one or more alert conditions detected.

6. The non-transitory storage medium of claim 1, comprising computer instructions for receiving a location coordinate for each of the one or more alert conditions detected.

7. The non-transitory storage medium of claim 6, wherein the location coordinate for each of the one or more alert conditions detected is supplied by at least one alert response center (ARC).

8. The non-transitory storage medium of claim 1, wherein the AGS is operated by a first service provider that is different from a second service provider operating the WAPs.

9. The non-transitory storage medium of claim 1, wherein the notification comprises a wireless message, and wherein the plurality of MCDs comprise one among a cell phone, a telemetry system in a vehicle supporting wireless communications, and a computing device supporting wireless communications.

10. A mobile communication device (MCD), comprising a controller element operable to:
 transmit to an alert generation system (AGS) a location coordinate in order for the AGS to submit an alert notice to the MCD when the MCD is in proximity to a location of an alert condition, wherein the alert condition is one of a plurality of alert conditions monitored by the AGS, wherein the AGS establishes at least one different proximity threshold for each of the plurality of alert conditions, and wherein each proximity threshold comprises a distance away from an affected area where an alert condition is identified;
 receive from the AGS the alert notice responsive to the MCD being in proximity to the location of the alert condition and satisfying the proximity threshold established for the alert condition;
 calculate a trajectory between the location coordinate of the MCD and a location coordinate of the alert condition included in the alert notice; and
 determine an alternate route to avoid the alert condition according to the location coordinate of the MCD, the calculated trajectory of the MCD and the location coordinate of the alert condition.

11. The MCD of claim 10, wherein the controller element is operable to direct a location element of the MCD to determine the location coordinate.

12. The MCD of claim 11, wherein the location element comprises a global positioning system (GPS) receiver.

13. The MCD of claim 10, wherein the controller element is operable to present the alert notice received by the MCD by way of at least one among a display, and an audio system of the MCD.

14. The MCD of claim 10, wherein the alert condition detected by the AGS comprises at least one among a predicted event, a pending event, and actual event, and wherein the MCD comprises one among a computer, a cellular phone, a satellite phone, and a telemetry system, each capable of wireless communications.

15. The MCD of claim 10, wherein the alert condition detected by the AGS comprises at least one among a hazardous weather event, a hazardous ground travel event, a hazardous air travel event, a hostility event, and an amber alert event.

16. A mobile communication device (MCD), comprising:
 a location receiver; and
 a controller coupled to the location receiver, the controller operable to:
  transmit to an alert generation system (AGS) a location coordinate in order for the AGS to submit an alert notice to the MCD when the MCD is in proximity to a location of an alert condition, wherein the alert condition is one of a plurality of alert conditions monitored by the AGS, wherein the AGS establishes at least one different proximity threshold for each of the plurality of alert conditions, and wherein each proximity threshold comprises a distance away from an affected area where an alert condition is identified;
  receive from the AGS the alert notice responsive to the MCD being in proximity to the location of the alert condition and satisfying the proximity threshold established for the alert condition;

receive from the AGS an alternate route to avoid the alert condition; and present navigation instructions based on the alternate route supplied by the AGS, and location information supplied by the location receiver.

17. The MCD of claim 16, wherein the controller is operable to:

calculate a trajectory between the location coordinate of the MCD and a location coordinate of the alert condition included in the alert notice; and present navigation instructions according to the alternate route, the calculated trajectory, and location information supplied by the location receiver.

* * * * *